US008724177B2

(12) United States Patent
Lee et al.

(10) Patent No.: US 8,724,177 B2
(45) Date of Patent: May 13, 2014

(54) PRINTING APPARATUS HAVING AUTOMATIC PRINTING SHEET FEEDER

(75) Inventors: Taik Min Lee, Daejeon (KR); Jeongdai Jo, Daejeon (KR); Dong Soo Kim, Daejeon (KR); Byung Oh Choi, Daejeon (KR); Chung Hwan Kim, Seoul (KR); Dong Youn Shin, Daegu (KR)

(73) Assignee: Korea Institute of Machinery & Materials, Daejeon (KR)

( * ) Notice: Subject to any disclaimer, the term of this patent is extended or adjusted under 35 U.S.C. 154(b) by 0 days.

(21) Appl. No.: 13/133,210

(22) PCT Filed: Jun. 9, 2010

(86) PCT No.: PCT/KR2010/003680
§ 371 (c)(1),
(2), (4) Date: Jun. 7, 2011

(87) PCT Pub. No.: WO2011/155644
PCT Pub. Date: Dec. 15, 2011

(65) Prior Publication Data
US 2013/0070306 A1 Mar. 21, 2013

(51) Int. Cl.
*B41C 1/02* (2006.01)
(52) U.S. Cl.
USPC .......... 358/3.29; 101/3.1; 101/4; 101/6; 101/7; 101/22; 101/36; 101/44; 101/212; 101/223
(58) Field of Classification Search
None
See application file for complete search history.

(56) References Cited

U.S. PATENT DOCUMENTS

| | | | | |
|---|---|---|---|---|
| 4,782,753 A * | 11/1988 | Bolza-Schunemann | ...... | 101/363 |
| 5,158,018 A * | 10/1992 | Masaki et al. | ............... | 101/158 |
| 5,327,194 A * | 7/1994 | Doi et al. | ......................... | 355/85 |
| 5,367,953 A * | 11/1994 | Yamashita et al. | ............ | 101/158 |
| 5,401,111 A | 3/1995 | Nubson et al. | | |
| 5,532,724 A | 7/1996 | Inagaki et al. | | |
| 5,533,447 A * | 7/1996 | Johnson et al. | ............... | 101/211 |
| 5,651,312 A * | 7/1997 | Borghesan | .................... | 101/216 |
| 5,692,442 A * | 12/1997 | Leanna | ......................... | 101/247 |
| 6,945,631 B2 * | 9/2005 | Adachi | ......................... | 347/55 |
| 7,232,773 B2 * | 6/2007 | Imai et al. | ..................... | 438/798 |
| 8,322,282 B2 * | 12/2012 | Burgess et al. | ............... | 101/477 |
| 2002/0002918 A1* | 1/2002 | Saito | ............................. | 101/348 |
| 2006/0254440 A1* | 11/2006 | Choi et al. | ..................... | 101/180 |
| 2012/0037023 A1* | 2/2012 | Suzuki et al. | .................. | 101/217 |
| 2012/0044511 A1* | 2/2012 | Saito et al. | ..................... | 358/1.9 |
| 2012/0160115 A1* | 6/2012 | Jo et al. | ......................... | 101/213 |

FOREIGN PATENT DOCUMENTS

JP 09-254504 9/1997
JP 10-193705 7/1998

* cited by examiner

*Primary Examiner* — Dung Tran
(74) *Attorney, Agent, or Firm* — Lexyoume IP Meister, PLLC

(57) ABSTRACT

A printing apparatus having an automatic printing sheet feeder integrated thereto to improve mass productivity. The printing apparatus includes a base, a moving stage, an automatic printing sheet feeder, and a printing roll. The moving stage is linearly movable along the base, and has a lithographic plate seated on the top surface thereof, the lithographic plate having a printing pattern thereon. The automatic printing sheet feeder is installed on the moving stage. The automatic printing sheet feeder includes an unwinding roll, which supplies the printing sheet, a rewinding roll, which collects the printing sheet, and a plurality of guide rolls, which guide the printing sheet to pass through the printing area of the moving stage. The printing roll is installed on the base, and performs printing by transferring ink from recesses of a printing pattern of the lithographic plate to the printing sheet on the moving stage.

8 Claims, 4 Drawing Sheets

Fig. 1        Prior Art
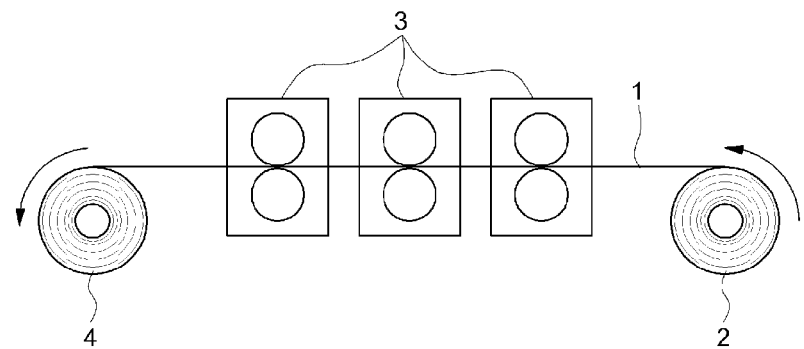
Fig. 2
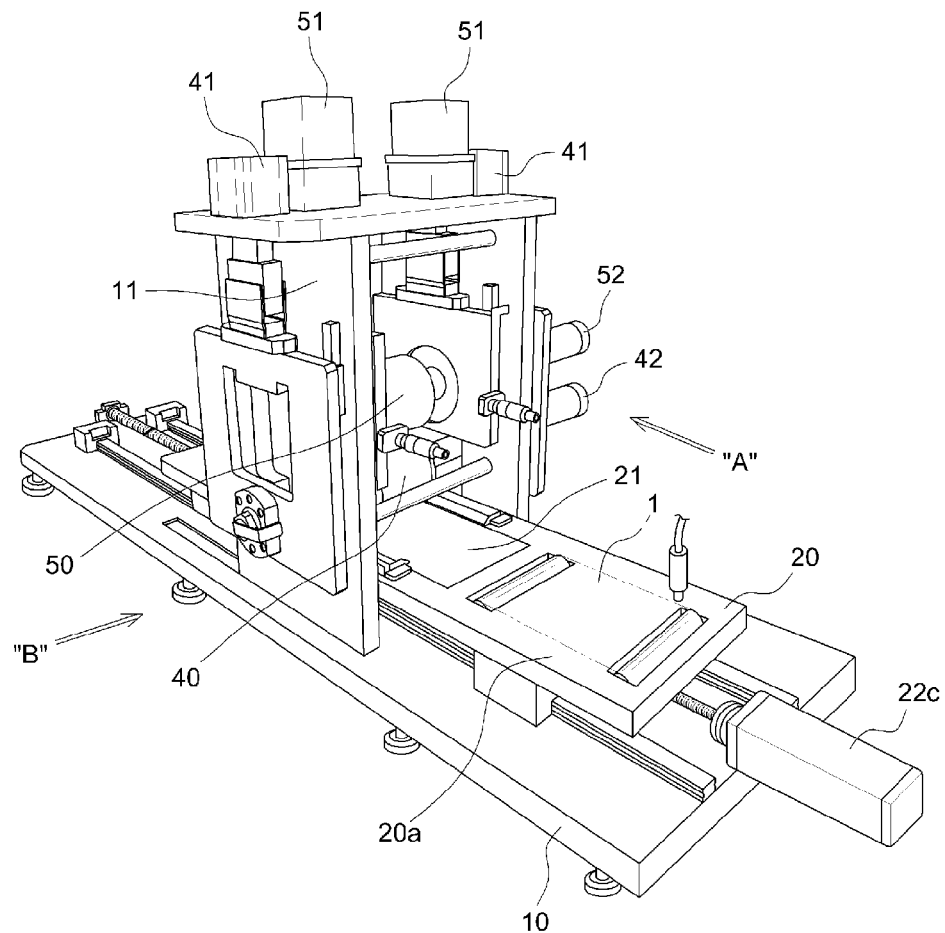

PRINTING APPARATUS HAVING AUTOMATIC PRINTING SHEET FEEDER

TECHNICAL FIELD

The present invention relates to a printing apparatus having an automatic printing sheet feeder. More particularly, the present invention relates to a printing apparatus having an automatic printing sheet feeder integrated thereto in order to improve mass productivity, the automatic printing sheet feeder automatically feeding and collecting printing sheets.

BACKGROUND ART

In general, offset printing is gaining attention as a method of mass producing electronic devices, such as Radio Frequency Identification (RFID) devices, polymer transistors, flexible displays, and solar cells. Such offset printing is suitable for mass production due to fast printing speed, since printing on printing sheets can be continuously and repeatedly performed by an engraving roll while the roll rotates.

FIG. 1 is a diagram showing an example of an offset printing apparatus of the related art.

Referring to FIG. 1, the offset printing apparatus of the related art generally includes an unwinder 2, which supplies a printing sheet 1, at least one printer 3, which prints electronic elements on the printing sheet 1, and a rewinder 4, which rewinds the printing sheet 1 after the printing by the printer 3 is completed.

In such an offset printing apparatus of the related art, since the unwinder and the rewinder are arranged in-line, the overall volume of the apparatus is increased, and the distance between the unwinder and the rewinder is long, thereby causing the printing sheet to become detached or making it difficult to maintain a desired amount of tension. This results in very strict design requirements, including the installation of control devices. Therefore, problems of high manufacturing costs and low productivity result.

DISCLOSURE OF INVENTION

Technical Problem

The present invention has been made to solve the foregoing problems with the prior art, and therefore an object of the present invention is to provide a printing apparatus having an automatic printing sheet feeder, which can reduce the size of the printing apparatus by efficiently arranging a printer and an automatic printing sheet feeder, and in which attachment devices for preventing a printing sheet from being detached and controlling tension are not necessarily installed, since the distance between the unwinding roll and the rewinding roll is small.

Solution to Problem

According to an aspect of the present invention, the printing apparatus includes a base, a moving stage, an automatic printing sheet feeder, and a printing roll. The moving stage is linearly movable along the base, and has a lithographic plate seated on the top surface thereof, the lithographic plate having a printing pattern thereon. The automatic printing sheet feeder is installed on the moving stage. The automatic printing sheet feeder includes an unwinding roll, which supplies the printing sheet, a rewinding roll, which collects the printing sheet, and a plurality of guide rolls, which guide the printing sheet to pass through the printing area of the moving stage. The printing roll is installed on the base, and performs printing by transferring ink from recesses of a printing pattern of the lithographic plate to the printing sheet on the moving stage.

Advantageous Effects of Invention

As set forth above, the invention has the effect of reducing the overall size of the printing apparatus by allowing the printer and the automatic printing sheet feeder to be efficiently arranged.

In addition, since the distance between the unwinding roll, the printer, and the rewinding roll is reduced, the danger that the printing sheet may be detached is low, and the change in tension is small. Therefore, it is possible to increase the reliability of printing. Accordingly, since attachment devices for preventing the printing sheet from becoming detached and controlling tension do not need to be installed, it is easy to design the apparatus. In addition, the productivity of the apparatus can be improved, since the manufacturing costs are low.

BRIEF DESCRIPTION OF DRAWINGS

FIG. 1 is a diagram showing an example of a printing apparatus of the related art;

FIG. 2 is an overall perspective view showing a printing apparatus according to the invention;

BEST MODE FOR CARRYING OUT THE INVENTION

Reference will now be made in detail to exemplary embodiments of the present invention, examples of which are illustrated in the accompanying drawings and described below.

Figure 3:
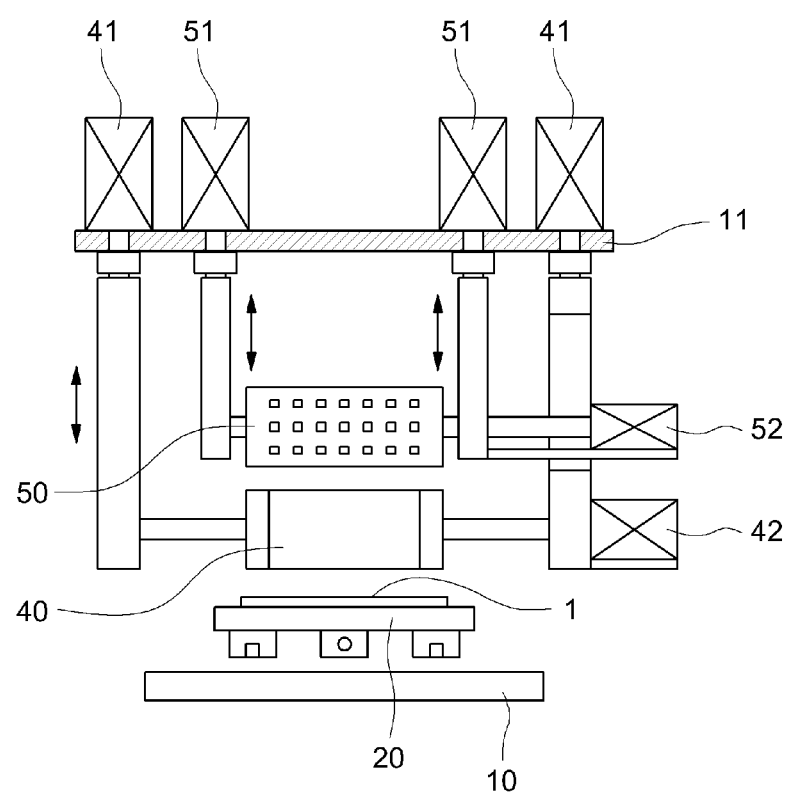
FIG. 3 is a view taken in the direction A of FIG. 2.
Figure 4:
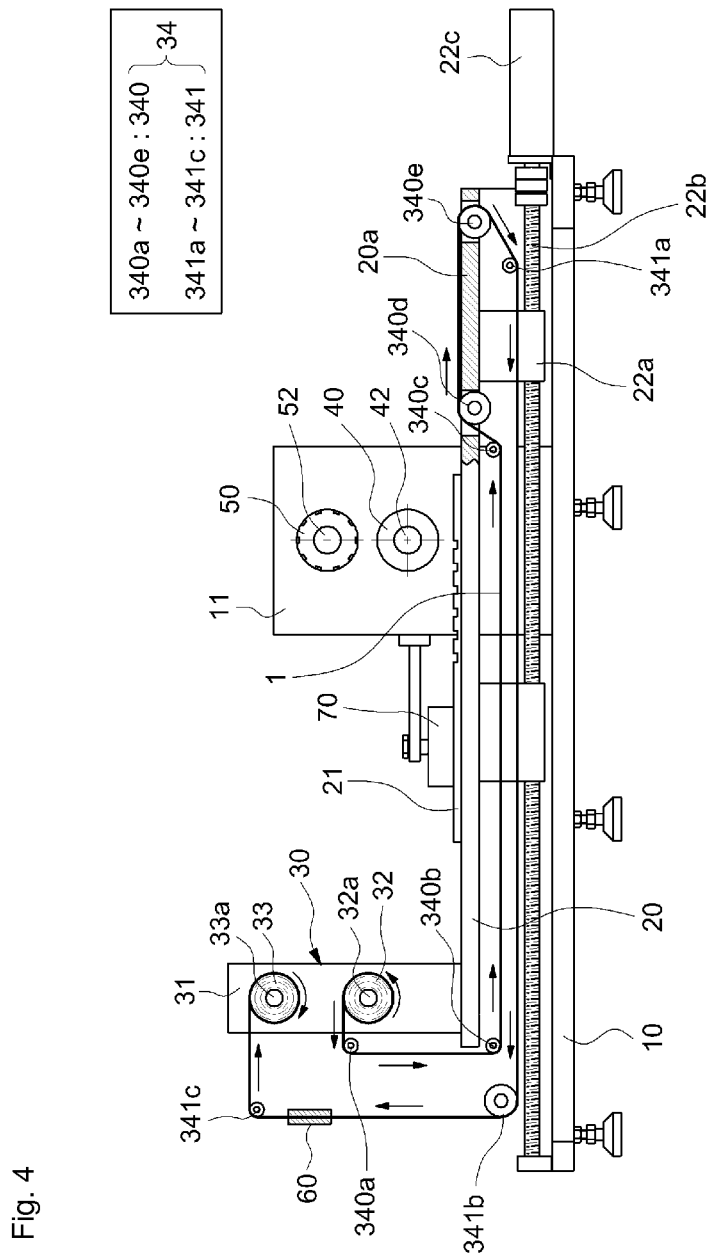
FIG. 4 is a view taken in the direction B of FIG. 2.

FIG. 2 is an overall perspective view showing a printing apparatus according to the invention, FIG. 3 is a view taken in the direction A of FIG. 2, and FIG. 4 is a view taken in the direction B of FIG. 2.

Referring to these figures, the printing apparatus of the invention includes a base 10, a moving stage 20, an automatic printing sheet feeder 30, and a printing roll 40. The moving stage 20 is linearly movable along the base 10, and a lithographic plate 21 having a printing pattern thereon is seated on the top surface of the moving stage 20. The automatic printing sheet feeder 30 is installed on the moving stage 20, and serves to continuously feed the printing sheet 1 to a printing area 20a of the moving stage 20 and to continuously collect the printing sheet 1 therefrom. The printing roll 40 is installed on the base 10, and serves to perform printing by transferring printing ink from the recesses of a printing pattern of the lithographic plate 21 to the printing sheet 1. In addition, the printing apparatus can also include an engraving roll 50, which can be used only in the case of roll printing. Furthermore, the printing apparatus can also include a curing device 60, which is installed upstream of a rewinding roll (described later) of the automatic printing sheet feeder, and serves to cure the printing ink printed on the printing sheet 1.

The moving stage 20 is installed such that it can be moved along the base 10 by a carrier unit 22, and the engraving plate 21, having an engraved printing pattern, is installed on the top surface of the moving stage 20. Here, the carrier unit 22 includes screw blocks 22a provided on the underside of the moving stage 20, a screw shaft 22b supported on the base 10 and coupled with the screw blocks 22a, and a drive motor 22c, which rotates the screw shaft 22b.

The automatic printing sheet feeder 30 includes a support 31 fixedly installed on the moving stage 20, an unwinding roll 32 installed on the support 31 such that it can be rotated by a motor 32a, a rewinding roll 33 installed on the support 31 such that it can be rotated by a motor 33a, and a plurality of guide rolls 34, which guides the printing sheet 1, unwound from the winding roll 32, to pass through the printing area 20a of the moving stage 20.

The guide rolls 34 include a plurality of feed rolls 340 and a plurality of return rolls 341. The feed rolls 340 guide the printing sheet 1, unwound from the unwinding roll 32, to the printing area 20a of the moving stage 20, and the return rolls 341 guide the printing sheet 1, on which printing is performed in the printing area 20a, to the rewinding roll 33 so that the printing sheet 1 is collected.

Here, the space below the moving space 20 should be used, since the printing sheet 1 should be guided while avoiding interference with the other devices. For this, the feed rolls 340 and the return rolls 341 can be configured as follows.

As shown in the figures, the feed rolls 340 include a first feed roll 340a, a second feed roll 340b, a third feed roll 340c, a fourth feed roll 340d, and a fifth feed roll 340e. The first feed roll 340a guides the printing sheet 1, unwound from the unwinding roll 32, in the transverse direction. The second feed roll 340b is installed on the moving stage 20, and guides the printing sheet 1, guided by the first feed roll 340a, to the space below the moving stage 20. The third feed roll 340c is installed on the moving stage 20, and guides the printing sheet 1, guided by the second feed roll 340b, in the transverse direction along the space below the moving stage 20. The fourth feed roll 340d is installed on the moving stage 20, and guides the printing sheet 2, guided by the third feed roll 340c, to the printing area 20a of the moving stage 20. The fifth feed roll 340e is installed on the moving stage 20, and guides the printing sheet 1, guided by the fourth feed roll 340d, in the transverse direction along the printing area of the moving stage 20.

The return rolls 341 include a first return roll 341a, a second return roll 341b, and a third return roll 341c. The first return roll 341a is installed on the moving stage 20, and guides the printing sheet 1, guided by the fifth feed roll 340e, along the space below the moving stage 20. The second return roll 341b guides the printing sheet 1, guided by the first return roll 341a, so that it is adjacent to the moving stage 20. The third return roll 341c guides the printing sheet 1, guided by the second return roll 341b, to the rewinding roll 33.

Here, it is preferred that the moving stage 20 have a first through-hole 23 through which the printing sheet 1 can pass, so that the printing sheet 1 can be guided to the space (i.e., the printing area) above the moving stage 20 by the fourth feed roll 340d, and a second through-hole 24 through which the printing sheet 1 can pass, so that the printing sheet 1 can be guided to the space below the moving stage 20 by the fifth guide roll 340e.

Figure 6:
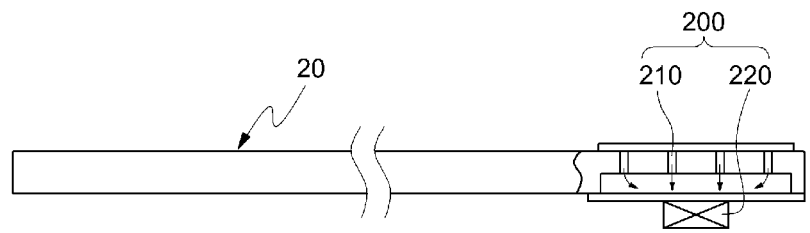
FIG. 6 is a view explaining a suction device of a moving plate.

In addition, it is possible to perform precision printing only if the printing sheet 1 is in complete contact with the moving stage 20 while passing through the printing area of the moving stage 20. For this, as shown in FIG. 6, it is preferred that a suction device 200 be installed on the moving stage 20.

Here, the suction device 200 includes a suction hole 210 formed in the printing area 20 of the moving stage 20 and a vacuum pump 220 installed below the suction hole 210. The vacuum pump 220 generates a vacuum force through the suction hole.

Alternatively, the feed rolls 340 and the return rolls 341 described as above can be configured as follows.

Figure 5:
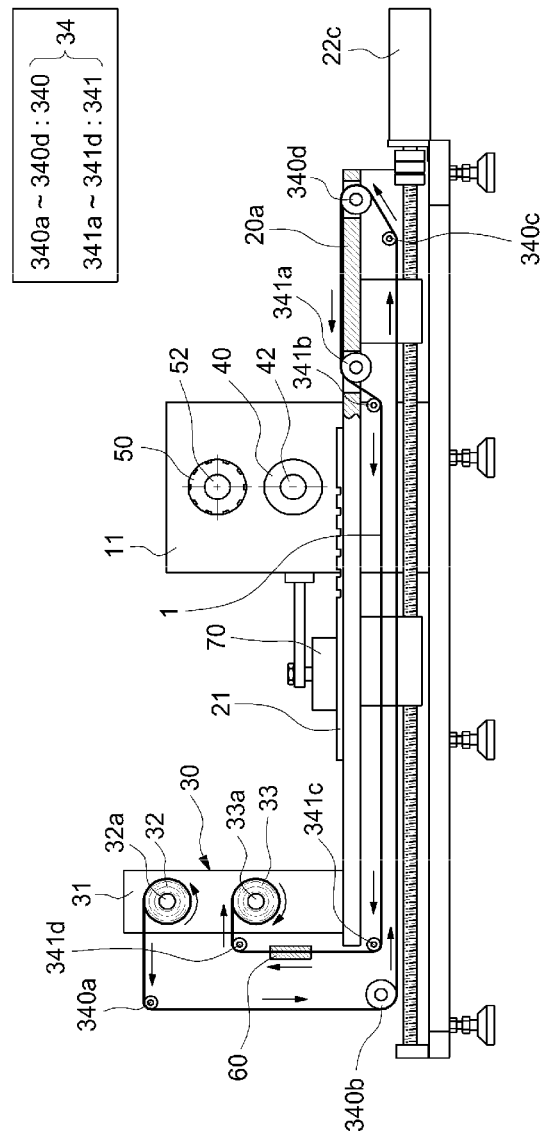
FIG. 5 is a view taken in the direction B of FIG. 2, showing another exemplary embodiment of the automatic printing sheet feeder.

That is, as shown in FIG. 5, the feed rolls 340 include a first feed roll 340a, a second feed roll 340b, a third feed roll 340c, and a fourth feed roll 340d. The first feed roll 340a guides the printing sheet 1, unwound from the unwinding roll 32, in the transverse direction. The second feed roll 340b is installed on the moving stage 20, and guides the printing sheet 1, guided by the first feed roll 340a, to the space below the moving stage 20. The third feed roll 340c is installed on the moving stage 20, and guides the printing sheet 1, guided by the second feed roll 340a, to the printing area 20a of the moving stage 20. The fourth feed roll 340d is installed on the moving stage 20, and guides the printing sheet 1, guided by the third feed roll 340c, in the transverse direction along the printing area of the moving stage 20.

The return rolls 341 include a first return roll 341a, a second return roll 341b, a third return roll 341c, and a fourth return roll 341d. The first return roll 341a is installed on the moving stage 20, and guides the printing sheet 1, guided by the fourth feed roll 340d, to the space below the moving stage 20. The second return roll 341b is installed on the moving stage 20, and guides the printing sheet 1, guided by the first return roll 341a, along the space below the moving stage 20. The third return roll 341c is installed on the support 31, and guides the printing sheet 1, guided by the second return roll 341b, in the perpendicular direction so that the printing sheet 1 is adjacent to the rewinding roll 33. The fourth return roll 341d guides the printing sheet 1, guided by the third return roll 341c, to the rewinding roller 33.

The printing roll 40 is installed by a bracket 11, which is fixed on the base 10. The printing roll 40 is in a position in which it can be elevated by first elevating members 41 and rotated by a first rotation motor 42.

The engraving roll 50 is used only in the case of roll printing, and has an engraved printing pattern formed in the outer circumference thereof. The engraving roll 50 is positioned such that it can be elevated by second elevating members 51, located on the bracket 11 above the printing roll 40, and rotated by the second motor 52.

The reference numeral 70, which has not been described, designates an ink tank, which serves to supply ink to the lithographic plate 21 while removing the ink from the portions of the lithographic plate 21 other than the printing pattern. In addition, an additional ink tank for supplying ink to the engraving roll 50 in the case of roll printing can also be installed.

Below, a brief description will be given of the process of operating the printing apparatus of the invention configured as above, mainly with respect to the lithographic plate.

The moving stage 20 is moved from the state in which the printing sheet 1 is set to the automatic printing sheet feeder 30, so that the printing pattern formed in the lithographic plate 21 is located below the ink tank 70, and then the moving stage 20 is repeatedly moved within a predetermined movement range in the lateral direction so that the ink is supplied from the ink tank 70 into the recesses of the printing pattern.

Afterwards, the moving stage 20 is moved in one direction 20, so that the lithographic plate 21 seated thereon is located below the printing roll 40.

Next, the printing roll 40, which is spaced apart from the lithographic plate 21, is moved downward so that the printing roll 40 comes into contact with the printing pattern of the lithographic plate 21.

Afterwards, the moving stage 20 is moved toward the ink tank 70 and the printing roll 40 is rotated synchronously, thereby transferring the ink from the recesses of the printing pattern to the surface of the printing roll 40.

Afterwards, when the ink pattern is transferred to the surface of the printing roll 40, the printing roll 40 is moved upward so that it is spaced apart from the lithographic plate 21, and then the printing roll 40 is rotated in the direction opposite to that of the transferring process, so that it returns to its original position.

Afterwards, the moving stage 20 is moved toward the ink tank 70, so that the printing surface of the printing sheet 1 is located below the printing roll 40.

Afterwards, the printing roll 40, which is spaced apart from the printing sheet 1, is moved downward so that it comes into contact with the printing sheet 1.

Next, the moving stage 20 is moved toward the ink tank 70, and the printing roll 40 is rotated at the same time, so that the ink adhering to the surface of the printing roll 40 is transfer-printed to the printing surface of the printing sheet 1.

Afterwards, both the unwinding roll 32 and the rewinding roll 33 are rotated together so that the portion of the printing sheet 1 on which printing has been performed is wound on the rewinding roll 33 and a new printing surface is located in the printing area 20*a* of the moving stage.

After this transfer printing is completed, the printing roll 40 and the moving stage 20 are returned to their original positions, and then the above-described processes are continuously repeated to continue the printing operation.

The invention claimed is:

1. A printing apparatus comprising:
   a base;
   a moving stage linearly movable along the base, wherein the moving stage has a lithographic plate seated on the top surface thereof, the lithographic plate having a printing pattern thereon;
   an automatic printing sheet feeder installed on the moving stage, wherein the automatic printing sheet feeder includes an unwinding roll, which supplies the printing sheet, a rewinding roll, which collects the printing sheet, and a plurality of guide rolls, which guide the printing sheet to pass through a printing area of the moving stage;
   a printing roll installed on the base, wherein the printing roll is installed by a bracket, which is fixed on the base, and is elevatable by a first elevating member; and
   an engraving roll installed on the bracket above the printing roll, the engraving roll being elevatable by a second elevating member,
   wherein the printing roll is disposed between the engraving roll and the lithographic plate and is configured to be alternatively contactable to the lithographic plate or the engraving roll, such that the printing roll performs printing by transferring ink from the lithographic plate to the printing sheet or by transferring ink from the engraving roll to the printing sheet.

2. The printing apparatus according to claim 1, wherein the printing roll is rotatable by a first rotation motor.

3. The printing apparatus according to claim 2, wherein the engraving roll is rotatable by a second rotation motor.

4. The printing apparatus according to claim 1, wherein the guide rolls include a plurality of feed rolls, which guide the printing sheet, unwound from the unwinding roll, to the printing area of the moving stage, and a plurality of return rolls, which guide the printing sheet, on which printing is performed in the printing area, to the rewinding roll so that the printing sheet is collected.

5. A printing apparatus comprising:
   a base;
   a moving stage linearly movable along the base, wherein the moving stage has a lithographic plate seated on the top surface thereof, the lithographic plate having a printing pattern thereon;
   an automatic printing sheet feeder installed on the moving stage, wherein the automatic printing sheet feeder includes an unwinding roll, which supplies the printing sheet, a rewinding roll, which collects the printing sheet, and a plurality of guide rolls, which guide the printing sheet to pass through a printing area of the moving stage; and
   a printing roll installed on the base, wherein the printing roll performs printing by transferring ink from recesses of a printing pattern of the lithographic plate to the printing sheet on the moving stage,
   wherein the guide rolls include a plurality of feed rolls, which guide the printing sheet, unwound from the unwinding roll, to the printing area of the moving stage, and a plurality of return rolls, which guide the printing sheet, on which printing is performed in the printing area, to the rewinding roll so that the printing sheet is collected,
   wherein the feed rolls include:
   a first feed roll, which guides the printing sheet, unwound from the unwinding roll, in a transverse direction;
   a second feed roll installed on the moving stage, wherein the second feed roll guides the printing sheet, guided by the first feed roll, to a space below the moving stage;
   a third feed roll installed on the moving stage, wherein the third feed roll guides the printing sheet, guided by the second feed roll, in a transverse direction along the space below the moving stage;
   a fourth feed roll installed on the moving stage, wherein the fourth feed roll guides the printing sheet, guided by the third feed roll, to the printing area of the moving stage; and
   a fifth feed roll installed on the moving stage, wherein the fifth feed roll guides the printing sheet, guided by the fourth feed roll, in a transverse direction along the printing area of the moving stage, and
   wherein the return rolls include:
   a first return roll installed on the moving stage, wherein the first return roll guides the printing sheet, guided by the fifth feed roll, along the space below the moving stage;
   a second return roll, which guides the printing sheet, guided by the first return roll, so that it is adjacent to the moving stage; and
   a third return roll, which guides the printing sheet, guided by the second return roll, to the rewinding roll.

6. The printing apparatus according to claim 5, further comprising a curing device installed upstream of the rewinding roll, wherein the curing device cures printing ink printed on the printing sheet.

7. A printing apparatus comprising:
   a base;
   a moving stage linearly movable along the base, wherein the moving stage has a lithographic plate seated on the top surface thereof, the lithographic plate having a printing pattern thereon;
   an automatic printing sheet feeder installed on the moving stage, wherein the automatic printing sheet feeder includes an unwinding roll, which supplies the printing sheet, a rewinding roll, which collects the printing sheet, and a plurality of guide rolls, which guide the printing sheet to pass through a printing area of the moving stage; and a printing roll installed on the base, wherein the printing roll performs printing by transferring ink from recesses of a printing pattern of the lithographic plate to the printing sheet on the moving stage, wherein the guide rolls include a plurality of feed rolls, which guide the printing sheet, unwound from the unwinding roll, to the printing area of the moving stage, and a plurality of return rolls, which guide the printing sheet, on which printing is performed in the printing area, to the rewinding roll so that the printing sheet is collected, wherein the feed rolls include:

a first feed roll, which guides the printing sheet, unwound from the unwinding roll, in a transverse direction;

a second feed roll installed on the moving stage, wherein the second feed roll guides the printing sheet, guided by the first feed roll, to a space below the moving stage, a third feed roll installed on the moving stage, wherein the third feed roll guides the printing sheet, guided by the second feed roll, to the printing area of the moving stage; and a fourth feed roll installed on the moving stage, wherein the fourth feed roll guides the printing sheet, guided by the third feed roll, in a transverse direction along the printing area of the moving stage.

8. The printing apparatus according to claim 7, further comprising a curing device installed upstream of the rewinding roll, wherein the curing device cures printing ink printed on the printing sheet.

* * * * *